Figure 1:
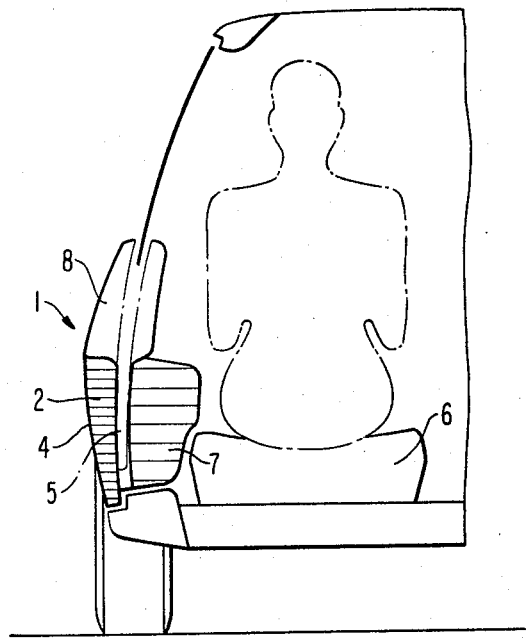

United States Patent [19]

Schmid et al.

[11] 4,272,103
[45] Jun. 9, 1981

[54] LATERAL PROTECTION OF MOTOR VEHICLES

[75] Inventors: Walter Schmid, Sindelfingen; Werner Breitschwerdt, Stuttgart; Guntram Huber, Aidlingen-Dachtel; Willi Reidelbach, Sindelfingen, all of Fed. Rep. of Germany

[73] Assignee: Daimler-Benz Aktiengesellschaft, Stuttgart-Untertuerkheim, Fed. Rep. of Germany

[21] Appl. No.: 909,070

[22] Filed: May 24, 1978

[30] Foreign Application Priority Data

May 27, 1977 [DE] Fed. Rep. of Germany ....... 2724017

[51] Int. Cl.³ .............................................. B60R 21/04
[52] U.S. Cl. .................................... 280/751; 296/189; 293/128
[58] Field of Search ................. 280/751, 752; 293/128, 293/126; 296/189

[56] References Cited

U.S. PATENT DOCUMENTS

| 3,185,497 | 5/1965 | Lagace | 280/751 |
| 3,936,090 | 2/1976 | Aya et al. | 280/751 |
| 3,989,275 | 11/1976 | Finch et al. | 280/751 |

FOREIGN PATENT DOCUMENTS

| 1441051 | 7/1976 | Fed. Rep. of Germany | 293/128 |
| 1441598 | 7/1976 | United Kingdom | 293/128 |

Primary Examiner—John J. Love
Assistant Examiner—Norman L. Stack, Jr.
Attorney, Agent, or Firm—Craig and Antonelli

[57] ABSTRACT

A flank protection for the protection of passengers from impacts of lateral areas of motor vehicles comprises a vehicle body side wall having a window, such as a door, wherein reinforcement for preventing excessive penetration of the vehicle by other vehicles is located solely in lower areas of the side wall, particularly in an outer body part, while an upper side wall portion is formed of inner and outer body parts, preferably above a belt line of the vehicle, are composed of resilient portions that are yieldable to the absorption of outwardly directed reaction forces applied by an occupant against said body parts above said belt line.

8 Claims, 2 Drawing Figures

LATERAL PROTECTION OF MOTOR VEHICLES

The present invention relates to side areas of motor vehicles, especially doors, equipped with a flank protection or lateral protection.

During a side impact against an obstacle, for example, against another motor vehicle, the passengers are directly affected by the collision occurrence because a sufficient squeeze zone as safety distance is lacking. A simple safety belt is similarly ineffectual because of the lacking relative path to the vehicle.

The present invention is therefore concerned with the task to construct the lateral areas of motor vehicles especially the doors, with means simple from a structural point of view and cost-favorable from a manufacturing point of view in such a manner that an effective protection of the passengers against injuries during a lateral impact can be achieved.

The underlying problems are solved according to the present invention in that the reinforcement effecting the flank protection is limited to the lower area of the doors or the like and an area adjoins thereabove yieldable to the absorption of outwardly directed reaction forces.

In one advantageous embodiment of the present invention, the lower area includes an impact cushion which is disposed in front of the reinforced area, as viewed from the inside.

A favorable construction of the present invention results in that the impact cushion and the reinforcement are arranged at a distance from one another by the window well.

Accordingly, it is an object of the present invention to provide a lateral protection of motor vehicles which avoids by simple means the aforementioned shortcomings and drawbacks encountered in the prior art.

Another object of the present invention resides in a lateral protection of motor vehicles which assures an effective protection of the passengers of the motor vehicle against injuries in case of a lateral impact.

A further object of the present invention resides in a flank protection for motor vehicles which is attainable by structurally simple means that can be manufactured in a relatively inexpensive manner.

Still a further object of the present invention resides in a flank protection of motor vehicles which effectively protects the passengers against lateral impacts without the need for bulky structures significantly reducing the space for the passengers within the motor vehicle.

Figure 2:
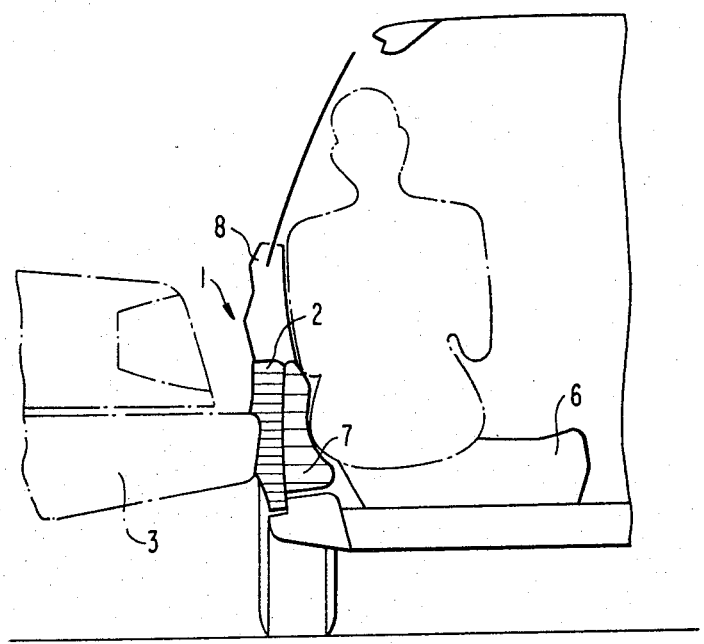

These and further objects, features and advantages of the present invention will become more apparent from the following description when taken in connection with the accompanying drawing which shows, for purposes of illustration only, one embodiment in accordance with the present invention, and wherein:

FIG. 1 is a schematic partial elevational view of a motor vehicle side area with a flank protection according to the present invention prior to a lateral impact; and FIG. 2 is a schematic elevational view of the motor vehicle side area of FIG. 1 showing the flank protection after a lateral impact.

Referring now to the drawing wherein like reference numerals are used throughout the two views to designate like parts, the motor vehicle half illustrated in FIGS. 1 and 2 shows on the driver side, especially within the area of the doors, a flank protection generally designated by reference numeral 1 which is subdivided according to the present invention into three zones. A zone with a reinforcement 2 is disposed in the outer area below the belt line of the vehicle (region shown which passes approximately across the middle of door 8 heightwise relative to the window) which prevents an excessive penetration after the impact of the vehicle 3 in that it opposes a relatively large resistance to the penetration, for example, by a good tieing-in of the sheet metal parts, bearers or the like of this area which extend in the longitudinal direction, into the overall structure of the vehicle. The reinforcement 2 thereby extends, for example, from the outer body covering 4 to the window well 5. On the other hand, a zone with an impact cushion 7 of any suitable known type is provided between the window well 5 and the vehicle seat 6, which can be so compressed in case of a lateral impact by the reaction forces emanating from the passengers that the passengers within their pelvis area are not loaded or stressed biomechanically beyond still acceptable limit values, i.e., at most are injured insignificantly.

In order not to impair the freedom of arm movement of the passengers, a further zone is provided in the door 8 above the vehicle belt line and adjoining the two zones 2 and 7 which is so constructed that it can be pushed far outwardly in case of a lateral impact by the reaction forces—as shown in FIG. 2—in order to avoid thereby injuries within the shoulder, chest and head area of the passengers.

A motor vehicle with such a flank protection arranged on both sides and constructed in accordance with the present invention offers greatest possible safety to its passengers against serious injuries in case of a lateral impact against an obstacle or in case of a lateral collision accident by another vehicle.

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. A flank protection for protection of passengers from impacts at lateral areas of motor vehicles comprising a vehicle body side wall having a window, and inner and outer body parts on opposite sides of a plane in which said window is located, wherein reinforcement means effecting lateral impact penetration protection by other vehicles are limited to lower areas of said side wall extending downwardly from a belt line of the vehicle and are comprised by one of said outer body parts and resilient portions of said inner and outer body parts above said belt line together form an area that is yieldable for the absorption of outwardly directed reaction forces applied by an occupant against said body parts above said belt line.

2. A flank protection according to claim 1, characterized in that the lateral areas are the areas of vehicle doors.

3. A flank protection according to claim 1 or 2, characterized in that the lower area includes an impact cushion means which is disposed in front of the reinforced area, as viewed from the inside of the vehicle.

4. A flank protection according to claim 3, characterized in that the impact cushion means and the reinforcement means are arranged at a distance from one another.

5. A flank protection according to claim 4, characterized in that said distance corresponds essentially to the width of a window well.

6. Flank protection for protection of passengers at lateral door areas of a motor vehicle comprising a door having a window portion at an upper part thereof, and a door body portion below said window portion, said door body portion having body parts on inner and outer sides of said window portion, said body parts including a reinforcement portion for preventing excessive penetration of said vehicle by inwardly imposed lateral impacts, said reinforcement portion being located only in a lower part of said outer body relative to said window part, and an outwardly yieldable portion for absorbing outwardly directed lateral impact reaction forces applied by an occupant against said inner body part, said outwardly yieldable portion being located in an upper part of said outer body part that adjoins an upper end of said reinforcement portion and in an upper part of said inner body part in a manner enabling said yieldable portion of the inner and outer body parts to act together in absorbing said reaction forces.

7. Flank protection according to claim 6, wherein said door body portion is provided with a window well, said reinforcement portion being located on an outer side thereof, said outwardly yieldable portion being located on both sides thereof, and a cushion being provided on an inner side of said window well adjoining both an inner side of said reinforcement portion and a lower end of said outwardly yieldable portion.

8. Flank protection according to claim 6 or 7 wherein said outwardly yieldable portion is disposed in parts of said door body above a belt line of the vehicle and said reinforcement portion is disposed in outer parts of said door body located below said belt line.

* * * * *